(12) United States Patent
Forthmann (10) Patent No.: US 12,553,967 B2
(45) Date of Patent: Feb. 17, 2026

(54) LOOSENING A MOVEABLE PART IN A SWITCHABLE DEVICE OF AN MRI SYSTEM

(71) Applicant: KONINKLIJKE PHILIPS N.V., Eindhoven (NL)

(72) Inventor: Peter Forthmann, Sandesneben (DE)

(73) Assignee: Koninklijke Philips N.V., Eindhoven (NL)

( * ) Notice: Subject to any disclaimer, the term of this patent is extended or adjusted under 35 U.S.C. 154(b) by 160 days.

(21) Appl. No.: 18/568,313

(22) PCT Filed: Jun. 2, 2022

(86) PCT No.: PCT/EP2022/064994
§ 371 (c)(1),
(2) Date: Dec. 8, 2023

(87) PCT Pub. No.: WO2022/258466
PCT Pub. Date: Dec. 15, 2022

(65) Prior Publication Data
US 2024/0272255 A1    Aug. 15, 2024

(30) Foreign Application Priority Data
Jun. 10, 2021 (EP) ..................................... 21178760

(51) Int. Cl.
G01R 33/38    (2006.01)
(52) U.S. Cl.
CPC ................................. G01R 33/3804 (2013.01)
(58) Field of Classification Search
None
See application file for complete search history.

(56) References Cited

U.S. PATENT DOCUMENTS

| | | | |
|---|---|---|---|
| 4,841,268 A | 6/1989 | Burnett et al. |
| 5,384,675 A | 1/1995 | Crawforth et al. |
| 5,412,186 A | 5/1995 | Gale |
| 5,771,000 A | 6/1998 | Matsumoto et al. |

(Continued)

FOREIGN PATENT DOCUMENTS

| | | |
|---|---|---|
| CN | 106812997 A | 6/2017 |
| JP | 07211209 A | 8/1995 |
| WO | 2020193415 A1 | 10/2020 |

OTHER PUBLICATIONS

International Search Report and Written Opinion from PCT/EP2022/064994 mailed Oct. 12, 2022.

*Primary Examiner* — Rodney E Fuller (57) ABSTRACT

Disclosed is an arrangement for loosening a moveable part resting at a first position within a switchable device of a magnetic resonance imaging system. The arrangement includes the moveable part, an inductor, and an alternating current supply. The moveable part is configured to switch the switchable device at least from a first state to a second state by moving from the first position to a second position within the switchable device The alternating current supply is configured to supply the inductor with an alternating current, such that the inductor is configured to loosen the moveable part by inducing vibrations of the moveable part, when the inductor receives the alternating current from the alternating current supply.

20 Claims, 5 Drawing Sheets

(56) References Cited

U.S. PATENT DOCUMENTS

| | | | |
|---|---|---|---|
| 6,126,405 A * | 10/2000 | Kawaguchi | F04B 27/1804 417/270 |
| 2014/0261717 A1 * | 9/2014 | Egley | F16K 29/00 137/15.01 |
| 2015/0153427 A1 | 6/2015 | Garside | |

* cited by examiner

LOOSENING A MOVEABLE PART IN A SWITCHABLE DEVICE OF AN MRI SYSTEM

CROSS REFERENCE TO RELATED APPLICATIONS

This application is a U.S. national phase application of International Application No. PCT/EP2022/064994 filed on Jun. 2, 2022, which claims the benefit of EP Application Serial No. 21178760.1 filed on Jun. 10, 2021 and is incorporated herein by reference.

FIELD OF THE INVENTION

The invention relates to hardware and software of magnetic resonance imaging systems, in particular to hardware and software for loosening a moveable part of a switchable device of the magnetic resonance system.

BACKGROUND OF THE INVENTION

Magnetic resonance imaging (MRI) systems may comprise different types of switchable devices, like e.g., valves or relays, with moveable parts. By moving the moveable part from one position to another such switchable devices may be switch from one state to another. For example, a valve, like a valve of a cooling line of a cryostat, may be switched from a closed state, in which a flow of a cryogenic fluid through the valve is blocked, to an open state, in which the cryogenic fluid flows through the valve, and vice versa. For example, a relay may be switched from a connecting state, in which a contact is established by the relay, to a disconnecting state, in which the contact is broken by the relay, and vice versa.

For such a switchable device there is a risk of the moveable part getting stuck. For example, the moveable part may get stuck due to jamming and/or freezing. In particular, in a cryostat there may be an increased risk of sticking due to the low temperatures of the cryogenic fluid. In case of a valve, the moveable part may even be arranged within the flow of the cryogenic fluid. When the moveable part is stuck at a position, problems may arise to switch the switchable device to another state. For example, problems may arise to open or close the valve or problems may arise to establish or break a contact by a relay.

The international application WO2020/193415 discloses a cryostat for a magnetic resonance examination system comprising a thermal switch with a ball valve integrated with the loop tube between a persistent current switch and a heat exchanger, the ball valve containing a ferromagnetic ball.

SUMMARY OF THE INVENTION

The invention provides for an arrangement, a cryostat, a magnetic resonance imaging system, a method, and a computer program in the independent claims. Exemplary embodiments are given in the dependent claims.

The arrangement allows for loosening a moveable part of a switchable device in an MRI system, without requiring direct access switchable device. An electromechanical vibrator is implemented by the arrangement, which acts on the moveable part, inducing vibrations of the moveable part, to loosen it, e.g., when the moveable part is mechanically stuck. Thus, the movable part may be vibrated or shaken loose, when being blocked, without a need to open or even disassemble sections of the MRI system comprising the switchable device.

In one aspect the invention provides for an arrangement for loosening a moveable part resting at a first position within a switchable device of a magnetic resonance imaging system. The arrangement comprises the moveable part, an inductor, and an alternating current supply. The moveable part is configured to switch the switchable device at least from a first state to a second state by moving from the first position to a second position within the switchable device. The inductor is connected with the alternating current supply via an electrical connection. The alternating current supply is configured to supply the inductor with an alternating current via the electrical connection. The inductor further is configured to loosen the moveable part by inducing vibrations of the moveable part, when the inductor receives the alternating current from the alternating current supply via the electrical connection.

This may be beneficial because it provides for a loosening of stuck moveable parts of switchable devices arranged in an MRI system or a preventing of such moveable parts getting stuck. This may in particular be beneficial for switchable devices without direct access, like valves or relays, in a cryostat and/or superconducting magnet of the MRI system. A moveable part may be stuck, when an actuator of the switchable devices configured for moving the movable part from its current (first) position to a target (second) position within the switchable device, is unable to move the moveable part from the current position due to a mechanical blocking. Due to the mechanical blocking, resulting, e.g., from an ice-building and/or jamming, a static friction to be overcome by the actuator to move the moveable part may exceed the force provided by the actuator. By vibrating the moveable part, i.e., applying vibrations to the moveable part at the current position, the movable part may be loosened, i.e., the mechanical blocking may be release or reduced, such that the force provided by the actuator is sufficient to overcome the remaining static friction of the moveable part at the current position and move the moveable part to the target position. The movement of the moveable part may comprise a rotation around an axis of rotation and/or a translational along a translational vector.

An inductor is understood as an electromagnet, i.e., a component configured to generate a magnetic field, when receiving an electric current. An inductor may be provided in form of a coil, e.g., a solenoid. A current flowing through a wire of the inductor, e.g., wound into a coil, may generate a magnetic field. The wire of the inductor may, e.g., be wound around a magnetic core made from a ferromagnetic or ferrimagnetic material. Using a core comprising ferromagnetic or ferrimagnetic material may increase the inductance of the inductor. The inductor is configured to generate an alternating magnetic field, when receiving an alternating current (AC).

In case the inductor is arranged within a static magnetic field, e.g., provided by a permanent magnet of the arrangement, an actuator of the switchable device or in form of a B0 field by a superconducting magnet of the MRI system, the AC flowing through the inductor may cause vibrations of the inductor due to Lorentz forces. These vibrations may be mechanically transferred to the moveable part in order to loosen it.

For example, the alternating magnetic field generated by the AC flowing through the inductor may cause vibrations of the switchable device being transferred mechanically to the moveable part or vibrations of the moveable part, e.g., due to magnetic interactions in case the switchable device or the moveable device, respectively, comprises a permanent magnet, a ferromagnetic section and/or a ferrimagnetic section. The vibrations of the switchable device or the moveable device may, e.g., be generated by alternating currents induced within a conductor comprised by switchable device or the moveable device, respectively. By the alternating magnetic field alternating currents, e.g., eddy currents, may be generated within the respective conductor being arranged within a static magnetic field, e.g., provided by a permanent magnet of the arrangement and/or the switchable device, an actuator of the switchable device or in form of a B0 field by a superconducting magnet of the MRI system.

Thus, the electrically driven inductor provided by the arrangement may be configured for inducing mechanical vibrations acting on a moveable part to loosen the moveable part, when being stuck mechanically. For example, the vibrations acting on a moveable part may be generated by the inductor vibrating by itself and mechanically transferring the vibrations of the inductor to the movable part being mechanically stuck. For example, the inductor may induce vibrations of the switchable device. The vibrations of the switchable device may be transferred mechanically to the movable part mechanically stuck within the switchable device. For example, the inductor may induce vibrations of the moveable part directly, e.g., by directly interaction with the moveable part mechanically stuck within the switchable device via an alternating magnetically field generated by the inductor.

The moveable part, when being stuck mechanically, may be vibrated loose. The moveable part may be stuck, i.e., a movement of the moveable part, e.g., actuated by an actuator of the switchable device, may be blocked due to build-up of ice or due to mechanical jamming. Thus, a possible risk of moveable parts of switchable devices built into sealed sections of an MRI system, e.g., a cryostat and/or superconducting magnet of the MRI system, getting stuck may be mitigated or even prevented.

For example, the switchable device may be a switchable device of a cryostat and/or a superconducting magnet of the magnetic resonance imaging system. A magnetic resonance imaging (MRI) system, in particular an MRI cryostat, may comprise multiple different components with moveable parts in them for switching the components from one state to another. Without loss of generality, it is referred to these components as switchable device or switches in the following.

The switchable devices may, e.g., be electrically driven. The switchable devices may, e.g., comprise electrically driven actuators configured to move the moveable parts upon being triggered. An actuator is a component that is configured to move a movable part. For example, an actor may be configured to open or close a valve. For example, an actor may be configured to establish or break an electrical contact. An actuator may, e.g., require a control signal for triggering the actor to move the moveable part and a source of energy for move the moveable part. The control signal may, e.g., be a direct current (DC) pulse. The energy source may, e.g., be an electric current, e.g., DC. For example, the control signal may at the same time provide the energy required for moving the moveable part. For example, the actor may comprise an electromagnet generating a static magnetic field for moving the moveable part using a magnetic force. For example, the actuator may be provided in form of a coil. When the actuator is triggered, i.e., receives the control signal, the actuator may respond by converting the source's energy, e.g., DC, into a mechanical motion of the movable part. For example, the actuator, like an electromagnet, may generate a static magnetic field using the DC. The moveable part may, e.g., be attracted or repelled by the static magnetic field generated by the actuator.

For any such switchable device, there is a risk of the moveable part getting stuck. This may, e.g., be caused by freezing, i.e., ice build-up, and/or jamming. If the force of the actuator of the switchable device is insufficient to get the moveable part free by itself, i.e., to move the moveable part from its current position to a target position, this may become a problem for the operation of the MRI system.

For example, the inductor may be provided by an actuator of the switchable device. The actuator may provide the inductor, e.g., in form of a coil, e.g., a solenoid. For example, the inductor may receive an AC for loosening the moveable part and a DC for moving the moveable part, e.g., after it has been unblocked. For example, first the AC may be applied for loosening the moveable part succeeded by the DC triggering the actuator to move the moveable part. For example, the actuator may be triggered with the DC to move the moveable part. In case the movement of the moveable part is mechanically blocked and the moveable part is detected to be stuck, the AC may be applied to the actuator to loosen the moveable part followed by a repeated application of the DC in order to trigger the actuator again to move the freed moveable part to its target position. By moving the moveable part to its target position, the switchable device may be switched to a target state.

For example, the arrangement further comprises a vibrating component comprising at least any one of the following a permanent magnet, a ferromagnetic section, a ferrimagnetic section, a conductor arranged within a first static magnetic field.

This may have the beneficial effect that vibrations of the vibrating component may be induced by the inductor receiving AC. The inductor generates an alternating magnetic field interacting with the vibrating component causing the vibrations of the component. The alternating magnetic field may, e.g., interact with the permanent magnet, the ferromagnetic section, the ferrimagnetic section, and/or the conductor of the vibrating component.

For example, the switchable device comprises the vibrating component and the arrangement is configured to generate using the alternating current received by the inductor an alternating magnetic field causing vibrations of the switchable device by vibrating the vibrating component. The vibrations of the switchable device induce the vibrations of the moveable part.

For example, the arrangement is configured to vibrate the switchable device by inducing vibrations of the vibrating component with the permanent magnet. The arrangement is configured to generate using the alternating current received by the inductor an alternating magnetic field causing the vibrations of the switchable device by vibrating the permanent magnet. For example, a housing of the switchable device may comprise the permanent magnet.

For example, the arrangement is configured to vibrate the switchable device by inducing vibrations of the vibrating component with the ferromagnetic section. The arrangement is configured to generate using the alternating current received by the inductor an alternating magnetic field causing the vibrations of the switchable device by vibrating the ferromagnetic section. For example, the housing of the switchable device may comprise the ferromagnetic section.

For example, the arrangement is configured to vibrate the switchable device by inducing vibrations of the vibrating component with the ferrimagnetic section. The arrangement is configured to generate using the alternating current received by the inductor an alternating magnetic field causing the vibrations of the switchable device by vibrating the ferrimagnetic section. For example, the housing of the switchable device may comprise the ferrimagnetic section.

For example, the arrangement is configured to vibrate the switchable device by inducing vibrations of the vibrating component with the conductor. The conductor is arranged within the first static magnetic field. The arrangement is configured to generate using the alternating current received by the inductor an alternating magnetic field causing the vibrations of the switchable device by inducing alternating currents within the conductor vibrating the conductor. For example, alternating currents induced within the conductor comprised by the switchable device may be eddy currents. For example, the housing of the switchable device may comprise the conductor.

For example, the moveable part comprises the vibrating component and the arrangement is configured to generate using the alternating current received by the inductor an alternating magnetic field causing the vibrations of the moveable part by vibrating the vibrating component.

For example, the moveable part comprises the vibrating component with the permanent magnet. The arrangement is configured to generate using the alternating current received by the inductor an alternating magnetic field causing the vibrations of the moveable part by vibrating the permanent magnet.

For example, the moveable part comprises the vibrating component with ferromagnetic section. The arrangement is configured to generate using the alternating current received by the inductor an alternating magnetic field causing the vibrations of the moveable part by vibrating the ferromagnetic section.

For example, the moveable part comprises the vibrating component with ferrimagnetic section. The arrangement is configured to generate using the alternating current received by the inductor an alternating magnetic field causing the vibrations of the moveable part by vibrating the ferrimagnetic section.

For example, the moveable part comprises the vibrating component with conductor. The first conductor is arranged within the first static magnetic field. The arrangement is configured to generate using the alternating current received by the inductor an alternating magnetic field causing the vibrations of the moveable part by inducing alternating currents within the first conductor vibrating the conductor. For example, alternating currents induced within the conductor of the moveable part may be eddy currents.

For example, the first static magnetic field may be provided by a permanent magnet. For example, the permanent magnet may be comprised by the arrangement. For example, the permanent magnet may be comprised by the switchable device. For example, a housing of the switchable device may comprise the permanent magnet.

For example, the first static magnetic field may be provided by an actuator of the switchable device. The actuator may generate the first static magnetic field for moving the moveable part from the first to the second position.

For example, the first static magnetic field may be generated by the magnetic resonance imagining system. The first static magnetic field generated by the magnetic resonance imagining system may, e.g., be the B0 field of the magnetic resonance imagining system, i.e., a strong static magnetic field for aligning nuclear spins of atoms as part of the procedure for acquiring magnetic response imaging data. The magnetic resonance imaging data may be used to reconstruct magnetic response images, e.g., of internal tissue-structures of a body of a patient.

For example, the arrangement further comprises the switchable device. The arrangement is further configured to vibrate the switchable device. The switchable device is configured to mechanically transfer the vibrations of the switchable device to the moveable part of the switchable device causing the vibrations of the moveable part.

This may have the beneficial effect of enabling vibrating the moveable part by vibrating the switchable device. For example, the arrangement may be configured to cause vibrations of the housing of the switchable device, which are mechanically transferred to the moveable part, e.g., mechanically stuck, within the switchable device.

For example, the inductor is mechanically connected to the switchable device. The inductor is arranged within a second static magnetic field. The inductor is configured to vibrate caused by the alternating current received from the alternating current supply. The arrangement is configured to vibrate the switchable device by mechanically transferring the vibrations of the inductor to the switchable device via the mechanical connection of the inductor.

This may have the beneficial effect that the vibrations of the inductor are mechanically transferred via the switchable device t the moveable part.

The inductor may be configured as a vibration device vibrating, because it is AC driven in a static magnetic background field. The AC-driven inductor, e.g., an AC-driven vibrating coil, may be provided in a static magnetic field of a permanent magnet, of an actuator of the switchable device, e.g., a solenoid, or of a superconducting magnet of the MRI system, i.e., the B0 field of the MRI system The inductor, e.g., a solenoid, may be mechanically connected to the switchable device or comprised by the switchable device, such that vibrations of the inductor may be mechanically transferred to the switchable device. The inductor may be arranged in a static magnetic background field, e.g., provided by a permanent magnet or an electromagnet. The inductor is driven by an AC received from an AC supply. Lorentz forces resulting from the electrons moving within the static magnetic field B may produce vibrations of the inductor, which are mechanically transferred to the switchable device. The resulting vibrations of the switchable device may shake the stuck moveable part loose, i.e., induce vibrations of the moveable part for loosening the movable part.

For example, the inductor may be mechanically connected to the housing of the switchable device.

For example, the switchable device may be comprised by a cryostat of the magnetic resonance imaging system. For example, the switchable device may be comprised by a superconducting magnet of the magnetic resonance imaging system. The superconducting magnet may be cooled by a cryostat. The arrangement may comprise the switchable device.

For example, the inductor may be comprised by a cryostat of the magnetic resonance imaging system. For example, the inductor may be comprised by a superconducting magnet of the magnetic resonance imaging system. The superconducting magnet may be cooled by a cryostat.

For example, the arrangement may be comprised by a cryostat of the magnetic resonance imaging system. For example, the arrangement may be comprised by a superconducting magnet of the magnetic resonance imaging system. The superconducting magnet may be cooled by a cryostat.

This may have the beneficial effect that a blocked moveable part may be loosened even in sealed sections of an MRI system, which are difficult to access. In particular, a blocked moveable part in a cryostat and/or a superconducting magnet of the MRI system may be loosened. In case of a cryostat, due to low temperatures at least within certain sections of the cryostat, there may be an increased risk of a blocking of moveable part, e.g., caused by a building of ice. Such a blocking may be effectively released by vibrating the blocked moveable part.

For example, the electrical connection is provided by an electrical supply line. The electrical supply line is in addition electrically connected to a direct current supply. The supply line is configured to supply the switchable device with a direct current for an actuator of the switchable device. The actuator is configured to move the moveable part from the first to the second position. The direct current supplied via the supply line is superposed by the alternating current supplied via the supply line.

This may be beneficial because DC and AC may be provided via the same supply line. In case of a DC driven switchable device, i.e., a switchable device with a DC driven actuator configured to switch the switchable device by moving a moveable part of the switchable device, a supply line for providing the DC for the switchable device is required per se. By superposing the DC current with an AC current for the inductor in the same supply line, no additional supply lines are required for supplying the AC. The result of a superposition of DC and AC may be that both currents are supplied simultaneously. Thus, a loosening vibration of the moveable part may be induced, while simultaneously actuating the switchable device, i.e., initiation the movement of the movable part being loosened. In case of a switchable device with a permanent magnet, only an additional capacitor may be needed to enable a superposition of the DC with an AC causing the inductor to vibrate. Such vibrations of the conductor may be transferred, e.g., mechanically, to the moveable part.

A combination of an AC driven vibration arrangement and a DC actuated switchable device using a common supply line for supplying the AC and DC may eliminates a pair of leads compared to a case, in which inductor of the AC driven vibration arrangement and the DC driven actuator of the switchable device are supplied with currents via independent supply lines. This may in particular be advantageous in case of a cryostat, because feedthroughs into the cryostat are problematic in view of added complexity as well as additional heat load.

For example, the arrangement further comprises a capacitor arranged in series with the inductor forming a resonant circuit configured to provide a resonance at a vibration frequency predefined for the vibrations of the moveable part.

A resonant circuit, also referred to as an LC circuit, with a resonance at a predefined target frequency may be used to maximize the current flow through the inductor for an alternating current alternating with the target frequency, while alternating currents with frequencies deviating from the target frequency are damped and thus filtered out. At resonance, the impedance of the series resonant circuit is at its minimum. Therefore, the series resonant circuit may only accept an alternating current whose alternating frequency is equal to the resonant frequency. For example, a DC may be filtered out. In case the DC is superimposed by an AC at resonance frequency, the series resonant circuit may only see the AD at resonance.

For example, the capacitor of the arrangement may be arranged parallel with a second inductor comprised by an actuator of the switchable device. Thus, an additional parallel resonant circuit with a resonance frequency at the vibration frequency predefined for the vibrations of the moveable part may be provided. At resonance, the impedance of the parallel resonant circuit is at its maximum thereby suppressing or rejecting alternating currents whose frequency is equal to the resonant frequency. Thus, an AC at resonance frequency may be filtered out for the actuator, i.e., the actuator does not see the AC. In case a DC is supplied superimposed by an AC at resonance frequency, the actuator may only see the DC.

For example, the switchable device is a valve of a cryostat of the magnetic resonance imaging system. This may have the beneficial effect that a moveable part of a valve of a cryostat may be loosened. In general, a cryostat is due to the necessary insulation a sealed section of an MRI system, which is difficult to access. However, due to low temperatures at least within certain sections of the cryostat, there may be an increased risk of a blocking of moveable part, e.g., caused by a building of ice. This may in particular be the case for valves in cooling lines of the cryostat through which a cryogenic fluid flows. Such a blocking may be effectively released by vibrating the blocked moveable part. The arrangement may, e.g., comprise the switchable device in form of the valve.

The MRI system may comprise a superconducting magnet, e.g., a superconducting cylindrical type magnet with a bore through it. A superconducting magnet is an electromagnet comprising coils of superconducting wire. The superconducting wire may be required to be cooled to cryogenic temperatures during operation. At cryogenic temperatures, the superconducting wire may reach its superconducting state. At the superconducting state, the wire may have no electrical resistance and therefore may be enabled to conduct much larger electrical currents than ordinary wire, allowing for creating intense magnetic fields. For cooling the superconducting magnet to cryogenic temperatures, a cryostat may be used.

The cryostat may be configured to hold a cryogenic fluid, e.g., a cryogen in a liquid state, with minimal evaporation. The cryogenic fluid may, e.g., be liquid helium. The cryogenic bath provided by the cryostat may be configured to keep the superconducting wire forming the superconducting magnet of the MRI system in its superconductive state. To maintain superconductivity, superconducting wire has to be kept below its transition temperature by being immersed in the cryogenic fluid, e.g., liquid helium.

The valve may be a valve of a cooling line of the cryostat of controlling the flux of cryogenic fluid flowing through the cooling line. For example, with the moveable part at the first position, the valve may be in an open state allowing cryogenic fluid to flow through the cooling line. With the moveable part at the second position, the valve may, e.g., be in a closed state preventing cryogenic fluid from flowing through the cooling line.

For example, with the moveable part at the first position, the valve may be in a closed state preventing cryogenic fluid from flowing through the cooling line. With the moveable part at the second position, the valve may, e.g., be in an open state allowing cryogenic fluid to flow through the cooling line.

The switchable device may for example be a valve in the cooling circuit for a magnet persistent current switch (MPCS) of an MRI system. The arrangement may, e.g., comprise the switchable device. The MRI system may comprise a superconducting magnet with a MPCS. The MPCS may comprise a cooling circuit controlled with the valve provided by the switchable device to carry-off heat from the during ramping of the superconducting magnet.

The MPCS is used to shunt the superconducting coil of the superconducting magnet using a superconducting shortcut such that the superconducting coil and the superconducting shortcut form a closed resistance free circuit. For charging the superconducting coil, the shortcut may be temporarily switched to a resistive state. The shortcut may, e.g., be heated by a heating element above superconducting temperatures such that it develops a small finite resistance. The circuit thus becomes an RL-circuit, and a power source may be used to inject a current into the superconducting coil. Since the coil of the magnet is superconducting with essentially zero resistance, the injected current flows through the coil, while little to none of the current flows through the shortcut. The external current may be increased until a target current level resulting in target magnetic field strength are attained. The current may be increased slowly to avoid a quench, e.g., over a period of 24 to 48 hours, until the target current level of, e.g., 500 to 1000 A, is reached.

When the target current level is reached, the shortcut may be switched to a superconducting state shorting the circuit across the superconducting coil. For example, the heating element may be turned off and the temperature of the shortcut cooled down to cryogenic temperatures by the cryostat. The external power supply may be disconnected and the current in the superconductive loop provided by the superconducting coil and shortcut may continue, potentially indefinitely, in persistence mode. In the superconducting state, the current flowing in persistent mode is in principle stable and low-noise. Therefore, the magnetic field induced by the current flowing in the superconducting coil is stable and low-noise as well.

For a valve of an MRI cryostat, loosening a stuck moveable part by applying AC to an inductor of the arrangement may have the beneficial that problems arising from the stuck moveable part may be resolved and/or prevented without a need to open the cryostat of the superconducting magnet of the MRI system.

For example, the cooling circuit of an MRI cryostat is provided with the inductor operating in the magnetic field of the superconducting magnet of the MRI system to loosen the moveable part of the switchable device, e.g., a valve within the cryostat, when the moveable part is stuck. The moveable part within the cryostat may, e.g., get stuck due ice forming in switchable device. The AC driven inductor may enable a loosening of the moveable part without a need to open the cryostat of the superconducting magnet.

For example, the switchable device is a relay of the magnetic resonance imaging system. A relay is an electrically operated switch. It may comprise one or more input terminals for a one or more control signals. It may further comprise one or more operating contact terminals. A relay may be used for controlling a circuit by an independent low-power signal, i.e., a trigger signal. A relay may, e.g., be used to control several circuits by a single signal. A relay may comprise one or more moveable parts. A relay may, e.g., comprise a coil, like a solenoid, as an actuator to move a moveable part of the relay. The arrangement may, e.g., comprise the switchable device in form of the relay.

For example, the relay may be a contactor. A contactor is a relay, i.e., an electrically-controlled switch, used for switching an electrical power circuit. A contactor may be controlled by a circuit which has a much lower power level than the switched circuit. A contactor may be configured to be directly connected to a high-current load device. The arrangement may, e.g., comprise the switchable device in form of the contactor.

For example, the arrangement further comprises a control module for controlling the arrangement. The control module may be configured to detect the moveable part being stuck at the first position and, in response to the detecting, to control the arrangement to loosen the moveable part. Additionally or alternatively, the control module may be configured to trigger the actuator of the switchable device to move the moveable part from the first position to the second position and, before or simultaneously with the triggering the actuator, to control the arrangement to loosen the moveable part preventively before or simultaneously with the moving of the moveable part.

Preventively controlling the arrangement to loosening the moveable part comprises, e.g., transferring vibrations of the inductor to the switchable device with a potential for a sticking movable part. In case a moveable part is sticking, it may be loosened by the inductor generating the vibrations of the switchable device causing vibrations of the moveable part.

For example, the moveable part may be stuck at the first position due to freezing and/or jamming.

The moveable part may be moveable by a translational movement. For example, moving the moveable part from the first position to the second position may comprise a translational movement. For example, the moveable part may be moved along a translational vector.

The moveable part may be moveable by a rotational movement. For example, moving the moveable part from the first position to the second position may comprise a rotational movement. For example, the moveable part may be rotated. For example, the moveable part may be rotated around a rotational axis. The rotational axis may for example be provided by a hinge enabling the movement of the moveable part.

The moveable part may, e.g., be a bendable part. For example, moving the moveable part from the first position to the second position may comprise bending the bendable part from a first position into a second position. For example, the bendable part may be bended around a bending axis.

In another aspect the invention provides for a cryostat for a magnetic resonance imaging system. The cryostat comprises a switchable device and an arrangement for loosening a moveable part resting at a first position within the switchable device. The arrangement comprises the moveable part, an inductor, and an alternating current supply. The moveable part is configured to switch the switchable device at least from a first state to a second state by moving from the first position to a second position within the switchable device. The inductor is connected with the alternating current supply via an electrical connection. The alternating current supply is configured to supply the inductor with an alternating current via the electrical connection. The inductor is further configured to loosen the moveable part by inducing vibrations of the moveable part, when the inductor receives the alternating current from the alternating current supply via the electrical connection.

For example, the cryostat may comprise an arrangement according to any of the previously described examples of an arrangement.

In another aspect the invention provides for a magnetic resonance imaging system. The magnetic resonance imaging system comprises a switchable device and an arrangement for loosening a moveable part resting at a first position within the switchable device. The arrangement comprises the moveable part, an inductor, and an alternating current supply. The moveable part is configured to switch the switchable device at least from a first state to a second state by moving from the first position to a second position within the switchable device. The inductor is connected with the alternating current supply via an electrical connection. The alternating current supply is configured to supply the inductor with an alternating current via the electrical connection. The inductor is further configured to loosen the moveable part by inducing vibrations of the moveable part, when the inductor receives the alternating current from the alternating current supply via the electrical connection.

For example, the cryostat may comprise an arrangement according to any of the previously described examples of an arrangement.

In another aspect the invention provides for a method for loosening a moveable part within a switchable device of a magnetic resonance imaging system using an arrangement. The arrangement comprises the moveable part, an inductor, and an alternating current supply. The moveable part rests at a first position within the switchable device and is configured to switch the switchable device at least from a first state to a second state by moving from the first position to a second position within the switchable device. The inductor is connected with the alternating current supply via an electrical connection. The alternating current supply is configured to supply the inductor with an alternating current via the electrical connection. The inductor further is configured to loosen the moveable part by inducing vibrations of the moveable part, when the inductor receives the alternating current from the alternating current supply via the electrical connection.

The method comprises activating the alternating current supply of the arrangement to supply the alternating current to the inductor. The alternating current flowing through the inductor causes the vibrations of the moveable part.

For example, the method may use an arrangement according to any of the previously described examples of an arrangement.

For example, the moveable part may be stuck at the first position, e.g., due to freezing and/or jamming. For example, the method for loosening the moveable part is executed in response to detecting that the moveable part is stuck at the first position.

For example, the moveable part may be moved from the first position to the second position by an actuator. For example, the method for loosening the moveable part may be executed preventively before triggering the actuator to move the moveable part from the first position to the second position. The method may further comprise triggering the actuator after preventively loosening the moveable part.

For example, the method for loosening the moveable part may be executed simultaneously with the triggering of the actuator to move the moveable part from the first position to the second position. Thus, the moveable part may be vibrated and loosened, while its movement is initiated.

In another aspect the invention provides for a computer program comprising machine executable instructions for execution by a processor of a magnetic resonance imaging system. The machine executable instructions are configured for controlling an arrangement comprised by the magnetic resonance imaging system to loosen a moveable part within a switchable device of the magnetic resonance imaging system. The arrangement comprises the moveable part, an inductor, and an alternating current supply. The moveable part rests at a first position within the switchable device and is configured to switch the switchable device at least from a first state to a second state by moving from the first position to a second position within the switchable device. The inductor is connected with the alternating current supply via an electrical connection. The alternating current supply is configured to supply the inductor with an alternating current via the electrical connection. The inductor is further configured to loosen the moveable part by inducing vibrations of the moveable part, when the inductor receives the alternating current from the alternating current supply via the electrical connection, Execution of the machine executable instruction causes the processor to control the arrangement of the magnetic resonance imaging system to activate the alternating current supply of the arrangement to supply the alternating current to the inductor. The alternating current flowing through the inductor causes the vibrations of the moveable part.

For example, the machine executable instructions may be configured for controlling an arrangement according to any of the previously described examples of an arrangement.

For example, the moveable part may be stuck at the first position, e.g., due to freezing or/or jamming. For example, the machine executable instructions may be configured to execute the method for loosening the moveable part in response to detecting that the moveable part is stuck at the first position.

For example, the moveable part may be moved from the first position to the second position by an actuator. For example, the machine executable instructions may be configured to execute the method for loosening the moveable part preventively before triggering the actuator to move the moveable part from the first position to the second position. The machine executable instructions may further be configured to trigger the actuator after preventively loosening the moveable part.

For example, machine executable instructions may further be configured to loosen the moveable part simultaneously with the triggering of the actuator to move the moveable part from the first position to the second position. Thus, the moveable part may be vibrated and loosened, while its movement is initiated.

It is understood that one or more of the aforementioned examples may be combined as long as the combined examples are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some embodiments, computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general-purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

A Magnetic Resonance Imaging (MRI) system is a system for acquiring magnetic resonance imaging data. The MRI system may further be configured for reconstructing the acquiring magnetic resonance imaging data into MRI images, also referred to as MR images. An MRI image is defined herein as being the reconstructed two- or three-dimensional visualization of structural data, e.g., anatomic data, contained within the magnetic resonance imaging data. This visualization may be performed using a computer.

BRIEF DESCRIPTION OF THE DRAWINGS

In the following preferred embodiments of the invention will be described, by way of example only, and with reference to the drawings in which.

DESCRIPTION OF EMBODIMENTS

Like numbered elements in these figures are either equivalent elements or perform the same function. Elements which have been discussed previously will not necessarily be discussed in later figures if the function is equivalent.

Figure 1:
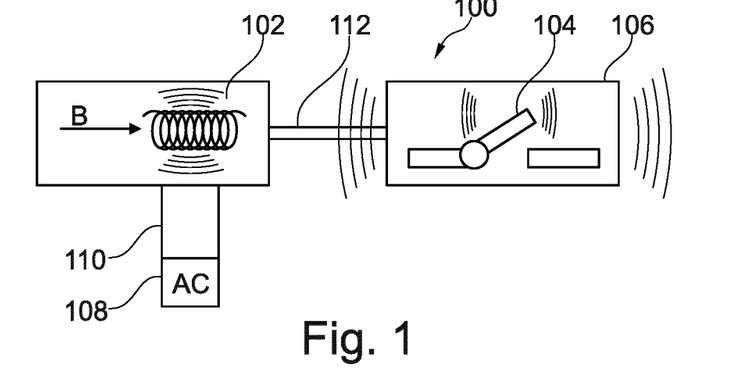
FIG. 1 illustrates an example arrangement for loosening a moveable part of a switchable device.

FIG. 1 illustrates an exemplary arrangement 100 for loosening a moveable part 104 of a switchable device 106. The arrangement 100 comprises the moveable part 104, an inductor 102, and an alternating current supply 108. The moveable part 104 is configured to switch the switchable device 106 at least from a first state to a second state by moving from the first position to a second position within the switchable device 106. The inductor 102 may, e.g., be provided in form of a coil, e.g., a solenoid. The inductor 102 is connected with the alternating current supply 108 via an electrical connection 110. The alternating current supply 108 is configured to supply the inductor 102 with an alternating current via the electrical connection 110. The inductor 102 further is configured to loosen the moveable part 104 by inducing vibrations of the moveable part 104, when the inductor 102 receives the alternating current from the alternating current supply 108 via the electrical connection 110. The switchable device 106 is a switchable device of an MRI system. For example, the switchable device 106 may be a valve of a cryostat of the MRI system. For example, the switchable device 106 may be a relay, like a contactor, of the MRI system. In particular, the switchable device 106 may be a relay of a cryostat or a superconducting magnet of the MRI system. The arrangement 100 may, e.g., comprises the switchable device 106.

The exemplary, wherein the arrangement 100 shown in FIG. 1 is configured to vibrate the switchable device 106. The switchable device 106 mechanically transfer the vibrations of the switchable device 106 to the moveable part 104 causing the vibrations of the moveable part 104.

The inductor 102 is mechanically connected to the switchable device 106 via a mechanical connection 112. The mechanical connection 112 may be provided in form of an external connection connecting the inductor 102 with the switchable device 106, in case the inductor 102 is arranged outside the switchable device 106, or the mechanical connection 112 may be provided in form of an internal connection, in case the inductor 102 is arranged within the switchable device 106. the switchable device may comprise the inductor 102. The inductor 102 is arranged within a static magnetic field B. The static magnetic field B may be provided by a permanent magnet or by an electromagnet. For example, an electromagnet of an actuator of the switchable device or a superconducting magnet of the MRI system may provide the static magnetic field B. The inductor 102 is configured to vibrate caused by the alternating current received from the alternating current supply 108. The arrangement 100 is configured to vibrate the switchable device 106 by mechanically transferring the vibrations of the inductor 102 to the switchable device 106 via the mechanical connection of the inductor 102.

Thus, Lorentz forces resulting from the electrons moving within the static magnetic field B may produce vibrations of the inductor 102, which are mechanically transferred to the switchable device 106. The resulting vibrations of the switchable device 106 may shake the stuck moveable part 104 loose, i.e., induce vibrations of the moveable part 104 for loosening the movable part 104.

The moveable part 104 shown in FIG. 1 is movable due to a hinge providing a rotational axis, around which the moveable part 104 is rotatable. Alternatively, moving the moveable part 104 may comprise a translational movement of the moveable part 104 and/or a deforming, e.g., a bending, of the moveable part 104. In case of a valve, the moveable part 104 may, e.g., be moved translationally from a position at which it blocks a flow of a fluid to a position, where the fluid flows around the moveable part 104.

Figure 2:
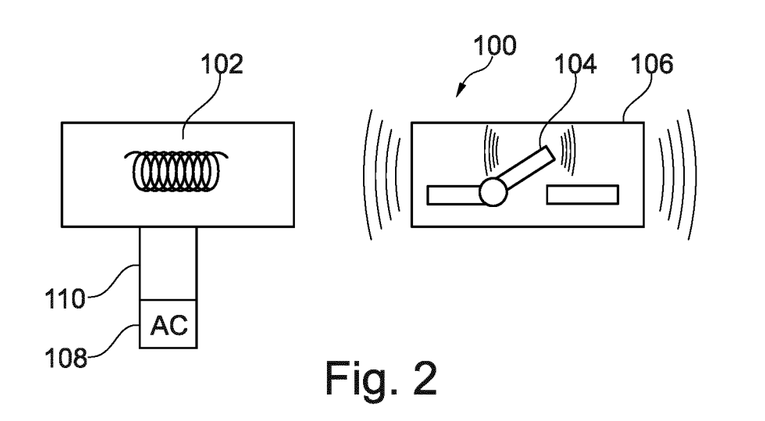
FIG. 2 illustrates an example arrangement for loosening a moveable part of a switchable device.

FIG. 2 illustrates a further exemplary arrangement 100 for loosening a moveable part 104 of a switchable device 106. The arrangement 100 is configured to vibrate the switchable device 106. In case of the arrangement 100 of FIG. 2, the vibrations of the switchable device 106 are not based on a transfer of vibrations of the inductor 102 via a mechanical connection. The vibrations of the switchable device 106 are rather based on an interaction of the switchable device 106 with an alternating magnetic field generated by the AC flowing through the inductor 108. For example, the switchable device 106 may comprise a vibrating component with a permanent magnet, a ferromagnetic section, a ferrimagnetic section, and/or a conductor arranged within a static magnetic field. The alternating magnetic field causes vibrations of the vibrating component of the switchable device 106 resulting in vibrations of the switchable device 106 mechanically transferred to the moveable part 104. In case of a conductor, the alternating magnetic field may generate alternating currents, e.g., eddy currents within the conductor resulting in Lorentz forces causing vibrations of the conductor. The static magnetic field may be provided by a permanent magnet or by an electromagnet. For example, a superconducting magnet of the MRI system may provide the static magnetic field.

Figure 3:
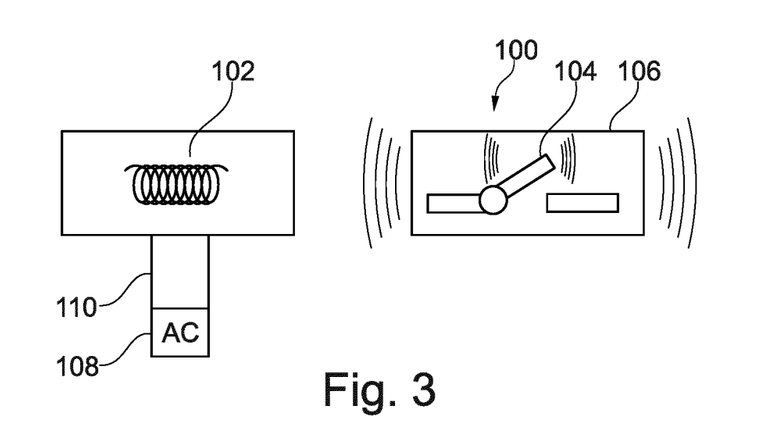
FIG. 3 illustrates an example arrangement for loosening a moveable part of a switchable device.

FIG. 3 illustrates a further exemplary arrangement 100 for loosening a moveable part 104 of a switchable device 106. The arrangement 100 is configured to vibrate the moveable part 104 by vibrating a vibrating component of the moveable part 104. The vibrating component may comprise a permanent magnet, a ferromagnetic section, a ferrimagnetic section, and/or a conductor arranged within a static magnetic field. The alternating magnetic field generated by the inductor 102 may cause vibrations of the vibrating component of the moveable part 104. In case of a conductor, the alternating magnetic field may generate alternating currents, e.g., eddy currents within the conductor resulting in Lorentz forces causing vibrations of the conductor. The static magnetic field may be provided by a permanent magnet or by an electromagnet. For example, an electromagnet of an actuator of the switchable device 106 or a superconducting magnet of the MRI system may provide the static magnetic field.

Figure 4:
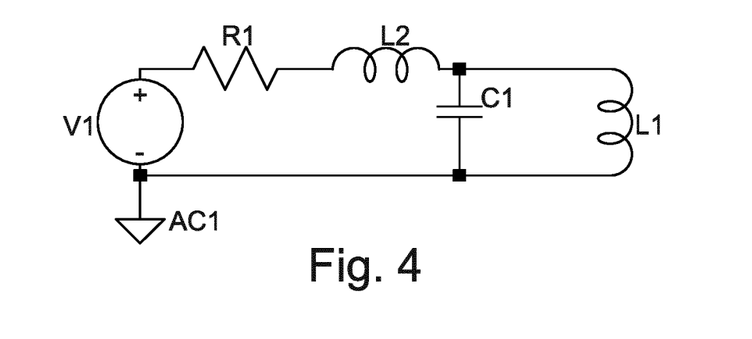
FIG. 4 shows an exemplary circuit diagram of an arrangement for loosening a moveable part of a switchable device.

FIG. 4 shows an exemplary circuit diagram illustrating an electrical circuit of an exemplary arrangement for loosening a moveable part of a switchable device. The switchable device may be a DC actuated switchable device. The inductor L2 may be integrated in the same circuit as an actuator L2, e.g., actuating electromagnet, of the switchable device. R1 is a wire resistance, L2 is the inductor, C1 is a shorting capacitor and L1 is an actuator, e.g., provided by a solenoid.

The switchable device, e.g., a valve or a relay, is actuated by the actuator L1. The capacitor C1 is in series with the inductor L2 creating a resonance at a target vibration frequency. When a DC voltage V1 with a superimposed AC is applied, the capacitor C1 may shorten out the actuator L1 for the AC, such that the actuator L1 only sees the DC component of the voltage V1 and performs its actuating action unchanged, while the inductor L2 only sees the AC component and vibrates due to receiving the respective AC current at the target vibration frequency. If the switchable device comprises a permanent magnet, the switchable device may be simplified, as that the permanent magnet may provide a background field that the inductor L2 needs to generate the vibrations.

The inductor L2 and the capacitor C1 may form a series resonant circuit, while the actor L1 and the capacitor C1 may form a parallel resonant circuit.

For example, R1 may be 0.1Ω, L2 may be 10 mH, C1 may be 10 F, and L1 300 mH.

Figure 5:
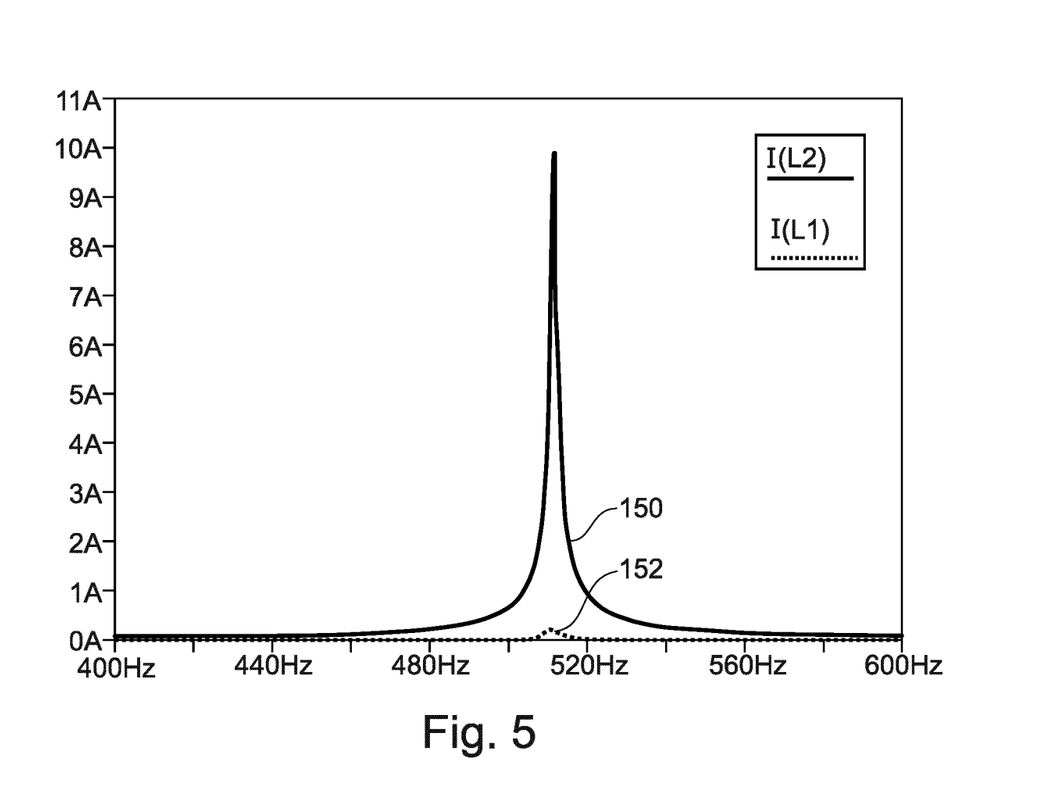
FIG. 5 illustrates an exemplary frequency dependence of the amount of current flowing through the circuit of FIG. 4.

FIG. 5 shows the currents in the actuator L1 and the inductor L2. It shows, how the capacitor C1 shorts out the actuator L1, i.e., the actuating solenoid, for AC, while AC flows mainly through the inductor L2.

Figure 6:
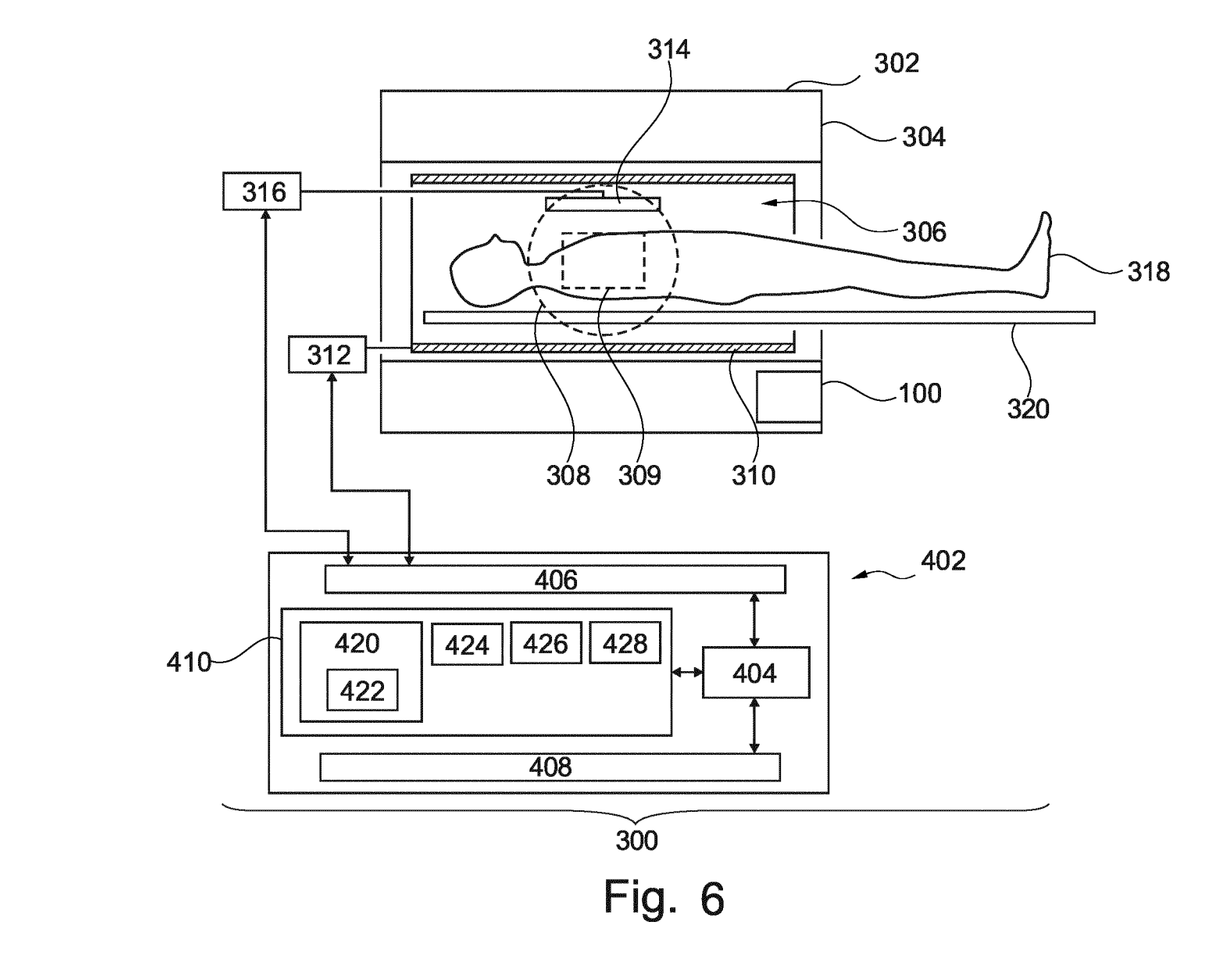
FIG. 6 illustrates an exemplary MRI system.

FIG. 6 illustrates an exemplary MRI system 100 comprising an arrangement 100 for loosening a moveable part of a switchable device of the MRI system 100. The switchable device may, e.g., be comprised by a cryostat 302 or a superconducting magnet 304 of the MRI system 100. The switchable device may, e.g., be a valve or a relay. The MRI system 300 is shown to be controlled by a computer 402 that has a processor 404. The computer 402 is shown as having an optional hardware interface 406 and an optional user interface 408 that are in communication with the processor 404. The hardware interface 406 may for example be used for controlling other components of the MRI system 300 shown in FIG. 6. The user interface 408 may for example be used by an operator to control and/or interact with the computer 102 to control the MRI system 300. The computer 402 is further shown as comprising a memory 410 that is in communication with the processor 404. The memory 410 is intended to represent one or more different types of memory that are in communication with the processor 404.

The memory is shown as containing machine-executable instructions 420 configured to control the MRI system 300. The machine-executable instructions 420 may control the MRI system 300 to acquire MRI data 426 using pulse sequence commands 424. The MRI data 426 may be used to reconstruct images 426. The machine-executable instructions 420 may comprise a computer program 422 with machine-executable instructions configured for controlling an arrangement 100 comprised by the magnetic resonance imaging system 300.

The machine-executable instructions 420 may enable the processor 404 to perform various tasks such as data processing, image processing, and controlling other components.

The magnetic resonance imaging system 300 may further comprise the magnet 304. The magnet 304 is a superconducting cylindrical type magnet with a bore 306 through it. The superconducting magnet 304 is cooled by a cryostat 302. The use of different types of magnets is also possible; for instance, it is also possible to use both a split cylindrical magnet and a so-called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils.

Within the bore 306 of the cylindrical magnet 304 there is an imaging zone 308 where the magnetic field is strong and uniform enough to perform magnetic resonance imaging. A region of interest 309 is shown within the imaging zone 308. The magnetic resonance data that is acquired typically acquired for the region of interest. A subject 318 is shown as being supported by a subject support 320 such that at least a portion of the subject 318 is within the imaging zone 308 and the region of interest 309.

Within the bore 306 of the magnet there is also a set of magnetic field gradient coils 310 which is used for acquisition of preliminary magnetic resonance data to spatially encode magnetic spins within the imaging zone 308 of the magnet 304. The magnetic field gradient coils 310 connected to a magnetic field gradient coil power supply 312. The magnetic field gradient coils 310 are intended to be representative. Typically, magnetic field gradient coils 310 contain three separate sets of coils for spatially encoding in three orthogonal spatial directions. A magnetic field gradient power supply supplies current to the magnetic field gradient coils. The current supplied to the magnetic field gradient coils 310 is controlled as a function of time and may be ramped or pulsed.

Adjacent to the imaging zone 308 is a radio-frequency coil 314 for manipulating the orientations of magnetic spins within the imaging zone 308 and for receiving radio transmissions from spins also within the imaging zone 308. The radio frequency antenna may contain multiple coil elements. The radio frequency antenna may also be referred to as a channel or antenna. The radio-frequency coil 314 is connected to a radio frequency transceiver 316. The radio-frequency coil 314 and radio frequency transceiver 316 may be replaced by separate transmit and receive coils and a separate transmitter and receiver. It is understood that the radio-frequency coil 314 and the radio frequency transceiver 316 are representative. The radio-frequency coil 314 is intended to also represent a dedicated transmit antenna and a dedicated receive antenna. Likewise, the transceiver 316 may also represent separate transmitters and receivers. The radio-frequency coil 314 may also have multiple receive/transmit elements and the radio frequency transceiver 316 may have multiple receive/transmit channels. For example, if a parallel imaging technique such as SENSE is performed, the radio-frequency could 314 will have multiple coil elements.

The transceiver 316 and the gradient controller 312 are shown as being connected to the hardware interface 406 of the computer 402.

The memory 410 is further shown as containing pulse sequence commands 424. The pulse sequence commands are commands or data which may be converted into the commands that enable the processor 404 to control the magnetic resonance imaging system 300 to acquire the MRI data 426, e.g., k-space data. The pulse sequence commands 424 are configured to acquire MRI data 426 that encodes the multiple magnetic resonance images 428, which are reconstructed using the MRI data 426.

Figure 7:
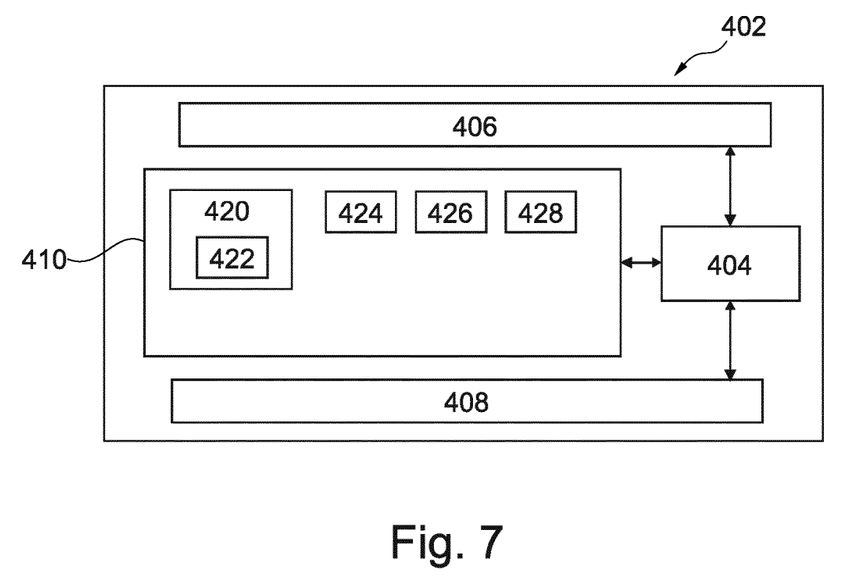
FIG. 7 illustrates an exemplary computer system configured for controlling the MRI system of FIG. 6.

FIG. 7 illustrates an exemplary computer 402 configured to control an MRI system, like the exemplary MRI system 300 shown in FIG. 6. The exemplary computer 402 may use a computer program 422 with machine executable instructions to control an arrangement 100 comprised by the MRI system 300 to loosen a moveable part within a switchable device of the MRI system 330. The computer program 422 may be stored in a memory 410 of the computer 402. The computer 402 may receive the computer program 422 via a network connection, e.g., from a server, like a cloud server, or from a computer program product. The computer program product may comprises a computer readable storage medium. The computer readable storage medium may have the program instructions of the computer program 422 embodied therewith. Storage medium comprised by the computer program product may, e.g., be an exchangeable storage medium.

Figure 8:
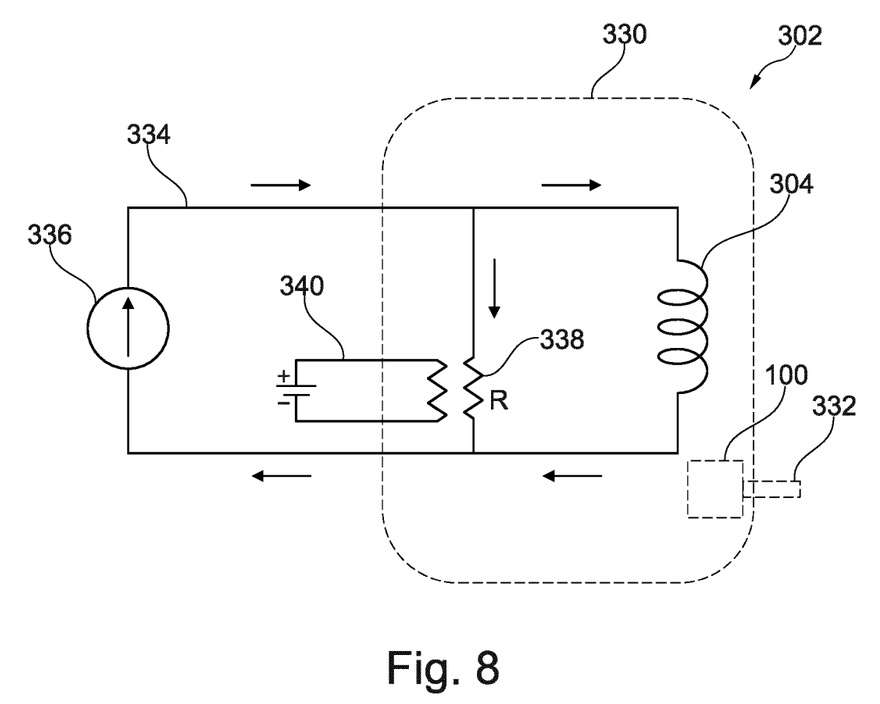
FIG. 8 illustrates an exemplary cryostat.

FIG. 8 illustrates an exemplary cryostat 302 with an MPCS for an MRI system, like the exemplary MRI system 300 shown in FIG. 6. The MRI system comprises a superconducting magnet 304. The superconducting magnet 304 may be arranged in a cryogenic bath 330 provided by the cryostat 302. The MPCS is configured to short-circuit superconducting winding of the superconducting magnet 304 with a piece of superconductor 338 provided by the MPCS once the superconducting magnet 304 has been energized. The winding of the superconducting magnet 304 forms a closed superconducting loop with the piece of superconductor 338, the power supply 336 supplying current to the superconducting magnet 304 may be turned off, while a persistent current may flow in a persistent mode through the superconducting loop, preserving the static magnetic field generated by the superconducting magnet 304 of the MRI system. The advantage of such a persistent mode may be that a highly stable magnetic field is provided without a need for providing additional energy to the superconducting magnet in order to power the winding.

The short circuit may be established using the MPCS, i.e., the piece of superconductor 338 inside the superconducting magnet 304 connected across the winding ends and attached to a heating element 340. When the magnet 304 is ramped up, the piece of superconductor 338 is heated by the heating element 340 above its transition temperature. Thus, the heated piece of superconductor 338 becomes resistive. Since the winding of the superconducting magnet 304 itself are cooled down by the cryogenic bath 330 below its transition temperature, the winding is superconductive without resistance. Consequently, no current or only a negligible amount of current may flow through the piece of superconductor 338. The supply current supplied to the superconducting magnet 304 may be increased until a target current level generating a target magnetic field strength is achieved. Then, the heating element 340 may be turned off and the MPCS with the piece of superconductor 338 may be cooled down by the cryostat 302 to its superconducting temperature, resulting in a short-circuiting of the winding of the superconducting magnet 304 via the now superconducting piece of superconductor 338. Then, the power supply 336 of the short-circuited superconducting magnet 304 may be turned off. The winding current flowing in a persistent state through the winding of the superconducting magnet 304 and the resulting magnetic field may decay slowly according to a normal inductive (L/R) time constant. R is a small residual resistance in the superconducting winding, e.g., due to joints or flux motion resistance.

Cryogenic fluid for cooling the superconducting magnet 304 may be supplied via a cooling line 332. The flow of the cryogenic fluid through the cooling line 332 may be controlled by a switchable device in form of a valve. The cryostat 302 may comprise an arrangement 100 to loosen a moveable part of the switchable device. Alternatively or additionally, a switchable device in form of a relay with a moveable part being loosened by the arrangement 100 may be comprised by the cryostat 302.

Figure 9:
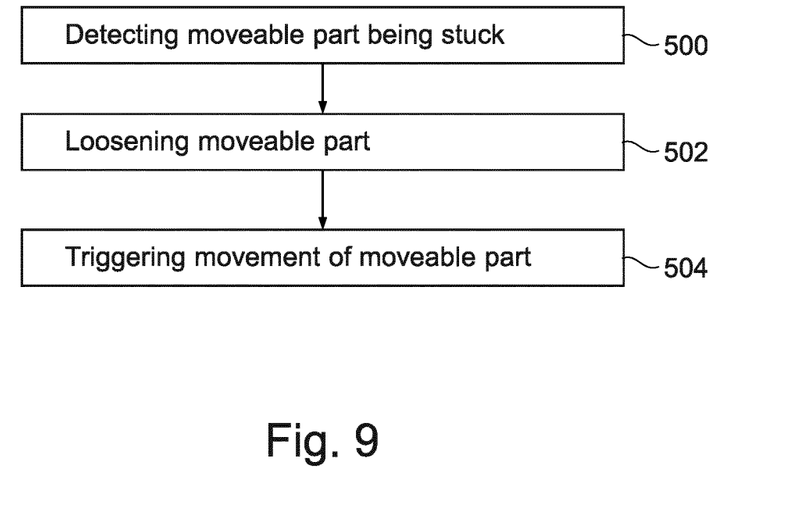
FIG. 9 shows a flow chart which illustrates an exemplary method for loosening a moveable part.

FIG. 9 shows a flow chart which illustrates an exemplary method for loosening a moveable part within a switchable device of a magnetic resonance imaging system using an arrangement. The arrangement comprises the moveable part, an inductor, and an alternating current supply. The moveable part rests at a first position within the switchable device and is configured to switch the switchable device at least from a first state to a second state by moving from the first position to a second position within the switchable device. The inductor is connected with the alternating current supply via an electrical connection. The alternating current supply is configured to supply the inductor with an alternating current via the electrical connection. The inductor further is configured to loosen the moveable part by inducing vibrations of the moveable part, when the inductor receives the alternating current from the alternating current supply via the electrical connection.

The arrangement may comprise control module for controlling the arrangement. In block 500, the control module detects the moveable part to be stuck at the first position. In block 502, the control module, in response to the detecting, controls the arrangement to loosen the moveable part. The control module may activate the alternating current supply of the arrangement to supply the alternating current to the inductor. The alternating current flowing through the inductor may cause the vibrations of the moveable part. In block 504, the control module triggers an actuator of the switchable device to move the moveable part from the first position to the second position. Thus, in block 504 a switching of the switchable device is triggered.

Figure 10:
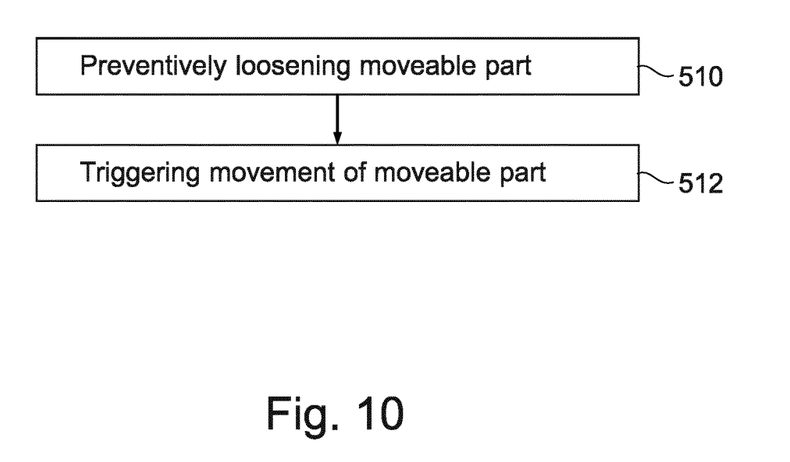
FIG. 10 shows a flow chart which illustrates an exemplary method for loosening a moveable part.

FIG. 10 shows a flow chart which illustrates a further exemplary method for loosening a moveable part within a switchable device of a magnetic resonance imaging system. In block 510, the control module controls the arrangement to loosen the moveable part preventively before or simultaneously with the moving of the moveable part. After the moveable part has been loosen, the control module triggers in block 512 the actuator of the switchable device to move the moveable part from the first position to the second position. For example, the loosening of the moveable part in block 510 may be executed simultaneously with the triggering of the actuator in block 512. Thus, the moveable part may be vibrated and loosened, while its movement is initiated.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

REFERENCE SIGNS LIST

100 arrangement
102 inductor
104 moveable part
106 switchable device
108 AC supply
110 electrical connection
112 mechanical connection
120 cooling line
300 MRI system
302 cryostat
304 magnet
306 bore of magnet
308 imaging zone
309 region of interest
310 magnetic field gradient coils
312 magnetic field gradient coil power supply
314 radio-frequency coil
316 transceiver
318 subject
320 subject support
330 cryogenic bath
332 cooling line
334 power supply
336 power source
338 superconductor
340 heating element
402 computer
404 processor
406 optional hardware interface
408 optional user interface
410 memory
420 machine executable instructions
422 program
424 pulse sequence commands
426 MRI data
428 images

The invention claimed is:

1. An apparatus for a magnetic resonance imaging system comprising a switchable device and an arrangement for loosening a moveable part resting at a first position within the switchable device of a magnetic resonance imaging system, the arrangement comprising the moveable part, an inductor, a capacitor, and an alternating current supply,
   the moveable part configured to switch the switchable device at least from a first state to a second state by moving from the first position to a second position within the switchable device,
   the inductor being connected with the alternating current supply via an electrical connection, the alternating current supply being configured to supply the inductor with an alternating current via the electrical connection,
   the capacitor arranged in series with the inductor forming a resonant circuit configured to provide a resonance at a vibration frequency predefined for the vibrations of the moveable part, and
   the inductor further being configured to loosen the moveable part by inducing vibrations of the moveable part, when receiving the alternating current from the alternating current supply via the electrical connection.

2. The apparatus of claim 1, wherein the arrangement further comprises a vibrating component comprising at least one of the following:
   a permanent magnet,
   a ferromagnetic section,
   a ferrimagnetic section, or
   a conductor arranged within a first static magnetic field.

3. The apparatus of claim 2, wherein the switchable device comprises the vibrating component and the arrangement is configured to generate using the alternating current received by the inductor an alternating magnetic field causing vibrations of the switchable device by vibrating the vibrating component, wherein the vibrations of the switchable device induce the vibrations of the moveable part, or wherein the moveable part comprises the vibrating component and the arrangement is configured to generate using the alternating current received by the inductor an alternating magnetic field causing the vibrations of the moveable part by vibrating the vibrating component.

4. The apparatus of claim 1, wherein the arrangement further comprises the switchable device, wherein the arrangement is further configured to vibrate the switchable device, wherein the switchable device is configured to mechanically transfer the vibrations of the switchable device to the moveable part of the switchable device causing the vibrations of the moveable part.

5. The apparatus of claim 4, wherein the inductor is mechanically connected to the switchable device, wherein the inductor is arranged within a second static magnetic field, wherein the inductor is configured to vibrate caused by the alternating current received from the alternating current supply, wherein the arrangement is configured to vibrate the switchable device by mechanically transferring the vibrations of the inductor to the switchable device via the mechanical connection of the inductor.

6. The apparatus of claim 1, wherein the electrical connection is provided by an electrical supply line, wherein the electrical supply line is in addition electrically connected to a direct current supply, wherein the supply line is configured to supply the switchable device with a direct current for an actuator of the switchable device, the actuator being configured to move the moveable part from the first to the second position, wherein the direct current supplied via the supply line is superposed by the alternating current supplied via the supply line.

7. The apparatus of claim 1, wherein the switchable device is a valve of a cryostat of the magnetic resonance imaging system.

8. The apparatus of claim 1, wherein the switchable device is a relay of the magnetic resonance imaging system.

9. The apparatus of claim 1, wherein the arrangement further comprises a control module for controlling the arrangement, the control module being configured for at least any one of the following:

to detect the moveable part being stuck at the first position and, in response to the detecting, to control the arrangement to loosen the moveable part, to trigger the actuator of the switchable device to move the moveable part from the first position to the second position and, before or simultaneously with the triggering the actuator, to control the arrangement to loosen the moveable part preventively before or simultaneously with the moving of the moveable part.

10. A magnetic resonance imaging system comprising an arrangement with a switchable device and configured for loosening a moveable part resting at a first position within the switchable device, the arrangement comprising the moveable part, an inductor, a capacitor, and an alternating current supply, the moveable part being configured to switch the switchable device at least from a first state to a second state by moving from the first position to a second position within the switchable device, the inductor being connected with the alternating current supply via an electrical connection, the alternating current supply being configured to supply the inductor with an alternating current via the electrical connection, the capacitor arranged in series with the inductor forming a resonant circuit configured to provide a resonance at a vibration frequency predefined for the vibrations of the moveable part, and the inductor further being configured to loosen the moveable part by inducing vibrations of the moveable part, when receiving the alternating current from the alternating current supply via the electrical connection.

11. A method for loosening a moveable part within a switchable device of a cryostat of a magnetic resonance imaging system using an arrangement, the arrangement comprising the moveable part, an inductor, a capacitor, and an alternating current supply, the moveable part resting at a first position within the switchable device and being configured to switch the switchable device at least from a first state to a second state by moving from the first position to a second position within the switchable device, the inductor being connected with the alternating current supply via an electrical connection, the alternating current supply being configured to supply the inductor with an alternating current via the electrical connection, the capacitor arranged in series with the inductor forming a resonant circuit configured to provide a resonance at a vibration frequency predefined for the vibrations of the moveable part, and the inductor further being configured to loosen the moveable part by inducing vibrations of the moveable part, when receiving the alternating current from the alternating current supply via the electrical connection, wherein the method comprises activating the alternating current supply of the arrangement to supply the alternating current to the inductor, the alternating current flowing through the inductor causing the vibrations of the moveable part.

12. A computer program comprising machine executable instructions stored on a non-transitory computer readable medium to perform the method of claim 11.

13. An apparatus for a magnetic resonance imaging system comprising:

a switchable device and an arrangement for loosening a moveable part resting at a first position within the switchable device of the magnetic resonance imaging system, the arrangement comprising the moveable part, an inductor, and an alternating current supply, the moveable part configured to switch the switchable device at least from a first state to a second state by moving from the first position to a second position within the switchable device, the inductor being connected with the alternating current supply via an electrical connection, the alternating current supply being configured to supply the inductor with an alternating current via the electrical connection, the inductor further being configured to loosen the moveable part by inducing vibrations of the moveable part, when receiving the alternating current from the alternating current supply via the electrical connection, wherein the arrangement further comprises a control module for controlling the arrangement, the control module being configured for at least any one of the following:

to detect the moveable part being stuck at the first position and, in response to the detecting, to control the arrangement to loosen the moveable part, to trigger the actuator of the switchable device to move the moveable part from the first position to the second position and, before or simultaneously with the triggering the actuator, to control the arrangement to loosen the moveable part preventively before or simultaneously with the moving of the moveable part.

14. The apparatus of claim 13, wherein the switchable device is a valve of a cryostat of the magnetic resonance imaging system.

15. The apparatus of claim 13, wherein the arrangement further comprises a vibrating component comprising at least one of the following:
   a permanent magnet,
   a ferromagnetic section,
   a ferrimagnetic section, or
   a conductor arranged within a first static magnetic field.

16. The apparatus of claim 15, wherein the switchable device comprises the vibrating component and the arrangement is configured to generate using the alternating current received by the inductor an alternating magnetic field causing vibrations of the switchable device by vibrating the vibrating component, wherein the vibrations of the switchable device induce the vibrations of the moveable part, or
   wherein the moveable part comprises the vibrating component and the arrangement is configured to generate using the alternating current received by the inductor an alternating magnetic field causing the vibrations of the moveable part by vibrating the vibrating component.

17. The apparatus of claim 13, wherein the arrangement further comprises the switchable device, wherein the arrangement is further configured to vibrate the switchable device, wherein the switchable device is configured to mechanically transfer the vibrations of the switchable device to the moveable part of the switchable device causing the vibrations of the moveable part.

18. The apparatus of claim 13, wherein the electrical connection is provided by an electrical supply line, wherein the electrical supply line is in addition electrically connected to a direct current supply, wherein the supply line is configured to supply the switchable device with a direct current for an actuator of the switchable device, the actuator being configured to move the moveable part from the first to the second position, wherein the direct current supplied via the supply line is superposed by the alternating current supplied via the supply line.

19. An apparatus for a magnetic resonance imaging system comprising a switchable device and an arrangement for loosening a moveable part resting at a first position within the switchable device of the magnetic resonance imaging system, the arrangement comprising the moveable part, an inductor, and an alternating current supply,
   the moveable part configured to switch the switchable device at least from a first state to a second state by moving from the first position to a second position within the switchable device,
   the inductor being connected with the alternating current supply via an electrical connection, the alternating current supply being configured to supply the inductor with an alternating current via the electrical connection,
   the inductor further being configured to loosen the moveable part by inducing vibrations of the moveable part, when receiving the alternating current from the alternating current supply via the electrical connection,
   wherein the arrangement further comprises the switchable device, and the arrangement is further configured to vibrate the switchable device, such that the switchable device is configured to mechanically transfer the vibrations of the switchable device to the moveable part of the switchable device causing the vibrations of the moveable part, and
   wherein the inductor is mechanically connected to the switchable device, wherein the inductor is arranged within a second static magnetic field, wherein the inductor is configured to vibrate caused by the alternating current received from the alternating current supply, wherein the arrangement is configured to vibrate the switchable device by mechanically transferring the vibrations of the inductor to the switchable device via the mechanical connection of the inductor.

20. The apparatus of claim 19, wherein the switchable device is a valve of a cryostat of the magnetic resonance imaging system.

* * * * *